United States Patent
Lee et al.

(10) Patent No.: US 7,088,666 B2
(45) Date of Patent: Aug. 8, 2006

(54) HIGH DENSITY OPTICAL DISK HAVING CAPACITY OF 25GB

(75) Inventors: Yong-hoon Lee, Gyeonggi-do (KR); In-sik Park, Gyeonggi-do (KR); Chong-sam Chung, Gyeonggi-do (KR); Du-seop Yoon, Gyeonggi-do (KR); Kyung-geun Lee, Gyeonggi-do (KR); Heui-jong Kang, Gyeonggi-do (KR); Han-kook Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 420 days.

(21) Appl. No.: 10/188,311

(22) Filed: Jul. 3, 2002

(65) Prior Publication Data

US 2003/0086359 A1    May 8, 2003

Related U.S. Application Data

(60) Provisional application No. 60/323,099, filed on Sep. 19, 2001.

(30) Foreign Application Priority Data

Jul. 5, 2001    (KR) ................................ 2001-40052

(51) Int. Cl.
    *G11B 7/24*    (2006.01)
(52) U.S. Cl. ................................ 369/275.3; 369/290.1
(58) Field of Classification Search ............ 369/275.2, 369/275.3, 275.4, 270, 271, 282, 289, 290, 369/291; 428/64.1, 64.4, 64.3
See application file for complete search history.

(56) References Cited

U.S. PATENT DOCUMENTS

| | | | | |
|---|---|---|---|---|
| 5,244,705 | A | * | 9/1993 | Tsurushima et al. ........ 428/64.4 |
| 5,400,316 | A | * | 3/1995 | Igarashi .................... 369/275.1 |
| 5,476,700 | A | * | 12/1995 | Asai et al. ................. 428/66.6 |
| 6,078,560 | A | * | 6/2000 | Kashiwagi ............... 369/275.5 |
| 6,246,656 | B1 | * | 6/2001 | Kawakubo et al. ...... 369/275.2 |
| 6,495,235 | B1 | * | 12/2002 | Uchida et al. .............. 369/282 |
| 6,512,735 | B1 | * | 1/2003 | Takeda et al. ........... 369/275.4 |
| 6,633,533 | B1 | * | 10/2003 | Kondo .................... 369/275.1 |
| 6,693,855 | B1 | * | 2/2004 | Kawashima et al. ....... 369/30.1 |
| 6,707,784 | B1 | * | 3/2004 | Sako et al. .............. 369/275.3 |

FOREIGN PATENT DOCUMENTS

JP    9-251676    9/1997

* cited by examiner

*Primary Examiner*—Tan Dinh
(74) *Attorney, Agent, or Firm*—Stein, McEwen & Bui, LLP

(57) ABSTRACT

A high density disc having a data area which is set such that compatibility is secured in the same drive while maintaining a superior recording/reproducing feature, is disclosed.

The high density disc has a center hole, a clamping area, a data area where user data is recorded, a lead in area located at the inner side of the data area, and a lead out area located at the outer side of the data area. In the high density disc in which the diameter of the center hole is 10 mm or more, the inner diameter of the clamping area is characteristically within a range of 20–26 mm. Also, the inner diameter of the data area is characteristically within a range of 35–40 mm.

Therefore, while a conventional disc drive is still used, the size of the high density disc decreases and a recording capacity can be increased.

80 Claims, 10 Drawing Sheets

HIGH DENSITY OPTICAL DISK HAVING CAPACITY OF 25GB

CROSS-REFERENCE TO RELATED APPLICATIONS

This application claims the benefit of Korean Application No. 2001-40052, filed Jul. 5, 2001 and U.S. Provisional Application No. 60/323,099, filed Sep. 19, 2001, in the Korean Industrial Property Office, the disclosure of which is incorporated herein by reference.

BACKGROUND OF THE INVENTION

1. Field of the Invention

The present invention relates to a high density, and more particularly, to a high density disc in which a data area is set to secure compatibility in the same drive while maintaining a superior recording and/or reproducing feature and a recording capacity.

2. Description of the Related Art

In general, an optical disc is widely used as an information recording medium of an optical pickup apparatus to record and/or reproduce information in a non-contact manner. The optical discs are divided into compact discs (CDs) and digital versatile discs (DVDs) according to its information recording capacity. Further, mini discs (MD) having a diameter of 65 mm or less may be added to the above classification.

These optical discs can be further divided into read only discs, such as CD-ROMs (read only memory) and DVD-ROMs, and recordable discs, such as CD-RWs and DVD-RAMs.

A CD is 1.2 mm thick and formed of polycarbonate (PC). The CD is reproduced by using a laser diode having a wavelength of 780 nm and has a track pitch of 1.6 μm and a recording capacity of 650 MB on a single side having an outer diameter of 120 mm.

In the case of a DVD, a polycarbonate reinforcement plate having a thickness of 0.6 mm is attached to a substrate having a thickness of 0.6 mm, thus forming a 1.2 mm thickness, so that the DVD is compatible with a CD-ROM drive. When a DVD is a single side disc of a 120 mm diameter, the recording capacity amounts to 4.7 GB. Also, a double side DVD having a recording capacity of 9.4 GB is formed by combining two 0.6 mm discs. The DVD is reproduced by a laser diode of a 650 nm wavelength and an objective lens having a numerical aperture (NA) of 0.65, and has a track pitch of about 0.74 μm. Also, a DVD having a diameter of 80 mm has a recording capacity of 1.47 GB corresponding to the recording capacity of two CDs.

Further, a high density disc, that is, an HD-DVD, has a recording capacity of about 25 GB on a single side having a 120 mm diameter. The HD-DVD is recorded and/or reproduced by using a laser diode of a 400 nm wavelength and an objective lens having an NA of 0.85, and has a track pitch of about 0.3 μm. Also, an HD-DVD having a 80 mm diameter has a recording capacity of about 7.8 GB.

Meanwhile, an HD TV requires a disc which can record and/or reproduce a 135 minute movie for HD. The disc for HD requires a recording capacity to record and/or reproduce about 23 GB or more on a single side of a disc having a 120 mm diameter, although not standardized yet.

The specifications of a CD and DVD are shown below in Table 1.

TABLE 1

|  | CD | DVD |
| --- | --- | --- |
| Diameter of disc (mm) | 120 | 120 |
| Thickness of disc (mm) | 1.2 | 1.2 |
| Thickness of information substrate (mm) | 1.2 | 0.6 |
| Track pitch (μm) | 1.6 | 0.74 |
| Size of minimum pit (μm) | 0.83 | 0.4 |
| Wavelength of laser beam (μm) | 780 | 635/650 |
| NA of objective lens (NA) | 0.5 | 0.65 |
| Capacity of single side disc (GB) | 0.65 | 4.7(1.47) |

FIG. 1 illustrates the structure of a disc 1 such as a CD or DVD. Referring to the drawing, the high density disc 1 can be divided into a center hole 10, a clamping area 20 to accommodate the high density disc 1 on a turntable (63 of FIG. 2) of a reproduction drive to be described later, a lead-in area 30 from which data begins to record, a data area 40 to record user data, and a lead-out area 50 at which the data area 40 ends.

Reproduction only data, used for purposes such as the size of the high density disc 1, the number of tracks on a surface to be read, or copy protection information, can be recorded in the lead-in area 30. The data area 40 is an area where a user can record and/or reproduce information. Also, other information related to the high density disc is recorded in the lead-out area 50. Reference numeral 25 denotes an area where a stack ring (not shown) is formed to prevent deterioration of productivity due to control of disc recording surfaces when discs manufactured during a disc injection step are stacked.

FIG. 2 illustrates a disc chucking apparatus of the disc 1. Here, the chucking apparatus of the high density disc 1 includes a spindle motor 60 to rotate the high density disc 1, a turntable 63 fixed to a rotation shaft of the spindle motor 60, on which the high density disc 1 is placed, and a clamping member 65 closely pressing the high density disc 1 against the turntable 63. As the high density disc 1 is closely pressed and fixed between the turntable 63 and the clamping member 65, when the high density disc 1 is rotated by the spindle motor 60, information can be reproduced without the high density disc 1 trembling.

A protruding portion 63a protruding from the center of the turntable 63 is inserted in the center hole 10 of the high density disc 1. A magnetic body 64 is provided at the turntable 63 or at the clamping member 65 so that the high density disc 1 is fixed by a magnetic force of the magnetic body 64. Here, an area of the high density disc 1 contacting the clamping member 65 is the clamping area 20.

In conventional CDs or DVDs, when the outer diameter (Φt) of the entire disc is 120 mm or 80 mm, the size of the center hole 10 is specified to be a diameter (Φh) of 15 mm. Also, the outer diameter of the clamping area 20 is specified to be a diameter (Φc) of about 32.7 mm.

The lead-in area 30 has a diameter of 46–50 mm or 45.2–48 mm for a CD or DVD, respectively. The inner diameter (Φd) of the data area 40 is 48.2 mm. In the case of a DVD+RW, the inner diameter (Φi) of the lead-in area 30 is specified to be 44.0 mm. For a disc having a diameter of 120 mm, the outer diameter (Φoe) of the lead-out area 50 can be up to 117 mm in length. For a disc having a diameter of 80 mm, the outer diameter (Φoe) of the lead-out area 50 is up to 78 mm in length.

However, when the overall diameter of a disc is small, for example, the overall diameter (Φt) of a disc is 64 mm, if the position (Φd) where user data starts is set to have a diameter of 48.2 mm, as in the CD or DVD, the data recording capacity is not sufficient. Further, if the above specifications are applied to a disc having an overall diameter of 50 mm, substantially no data area exists. If the diameter of the center hole 10 is formed to be less than 15 mm to compensate for the insufficient data area, a problem of compatibility with a disc drive for a disc having an overall diameter of 120 mm or 80 mm occurs.

There is a method of decreasing the size of the clamping area 20 to secure the recording capacity of a disc. However, since the diameter ($\Phi c$) of the clamping area 20 is limited to be within 33.0 mm, it is difficult to secure compatibility with a disc drive and simultaneously increase the recording capacity. The size of the clamping area 20 is determined by a deviation factor of a disc, the number of rotations of the spindle motor 60, or the clamping force of a disc. Since a vibration feature of a disc deteriorates when the clamping area 20 is reduced, there is a certain limit in decreasing the clamping area 20. Presently, most spindle motors 60 for CD-ROMs or DVD-RAMs have an outer diameter of 28.0 mm or less while the outer diameter of the turntable 63 is 30.0 mm or less, which satisfies the size of the clamping area of a disc, that is, a diameter of 33.0 mm or less.

Since the conventional high density disc such as a CD or DVD is large, a drive for the high density disc is also large and difficult to carry. Considering portability first, a high density disc having a smaller diameter must be used. When the diameter of a disc is decreased, recording capacity decreases so that data cannot be recorded sufficiently. Also, repetition of recording is restricted and accordingly free editing is restricted, which prevents an increase of value of data. Thus, new specifications of a high density disc are needed so that a high density recording capacity is secured and simultaneously a small disc can be compatibly recorded and/or reproduced in the same drive.

SUMMARY OF THE INVENTION

Accordingly, it is an object of the present invention to provide a small and high density disc which can be compatibly used in a conventional disc drive while securing a high density recording capacity.

Additional objects and advantages of the invention will be set forth in part in the description which follows and, in part, will be obvious from the description, or may be learned by practice of the invention.

The foregoing and other objects of the present invention are achieved by providing a high density disc comprising a center hole having a diameter of 10 mm or more; a clamping area; a data area where user data is recorded; a lead-in area located at the inner side of the data area, and a lead-out area located at the outer side of the data area, in which the inner diameter of the clamping area is within a range of 20–26 mm.

It is an aspect of the present invention to provide that the inner diameter of the lead-in area is within a range of 33–36 mm.

It is yet another aspect of the present invention to provide that the inner diameter of the data area is within a range of 35–40 mm.

It is yet another aspect of the present invention to provide that, when the inner diameter of the data area is 36 mm, the outer diameter thereof is within a range of 39–44 mm.

It is yet another aspect of the present invention to provide that, when the inner diameter of the data area is 40 mm, the outer diameter thereof is within a range of 42–48 mm.

It is yet another aspect of the present invention to provide that the high density disc comprises at least one transparent substrate and at least one recording layer, and the thickness of the transparent substrate is 0.2 mm or less.

It is yet another aspect of the present invention to provide that the boundary between the data area and the lead-out area is within a range of 62–64 mm.

It is yet another object of the present invention to provide that the boundary between the data area and the lead-out area is within a range of 76–79 mm.

It is yet another aspect of the present invention to provide that the boundary between the data area and the lead-out area is within a range of 116–119 mm.

It is yet another aspect of the present invention to provide that a metal plate is inserted into the center hole.

It is yet another aspect of the present invention to provide that the high density disc comprises a groove track and a land track, and recording can be performed on at least one of the groove track and the land track.

The foregoing and other objects of the present invention may also be achieved by providing a high density disc comprising: a center hole having a diameter of 10 mm or more; a clamping area; a data area where user data is recorded; a lead-in area located at the inner side of the data area, and a lead-out area located at the outer side of the data area, in which the inner diameter of the data area is within a range of 35–40 mm.

The foregoing and other objects of the present invention may also be achieved by providing a high density disc comprising: a center hole having a diameter of 10 mm or more; a clamping area: a data area where user data is recorded; a lead-in area located at the inner side of the data area, and a lead-out area located at the outer side of the data area; in which the clamping area is within a range of 23–26 mm in diameter and the lead-in area is within a range of 33–36 mm in diameter.

BRIEF DESCRIPTION OF THE DRAWINGS

These and other objects and advantages of the invention will become apparent and more readily appreciated from the following description of the embodiments, taken in conjunction with the accompanying drawings of which.

DETAILED DESCRIPTION OF THE INVENTION

Figure 1:
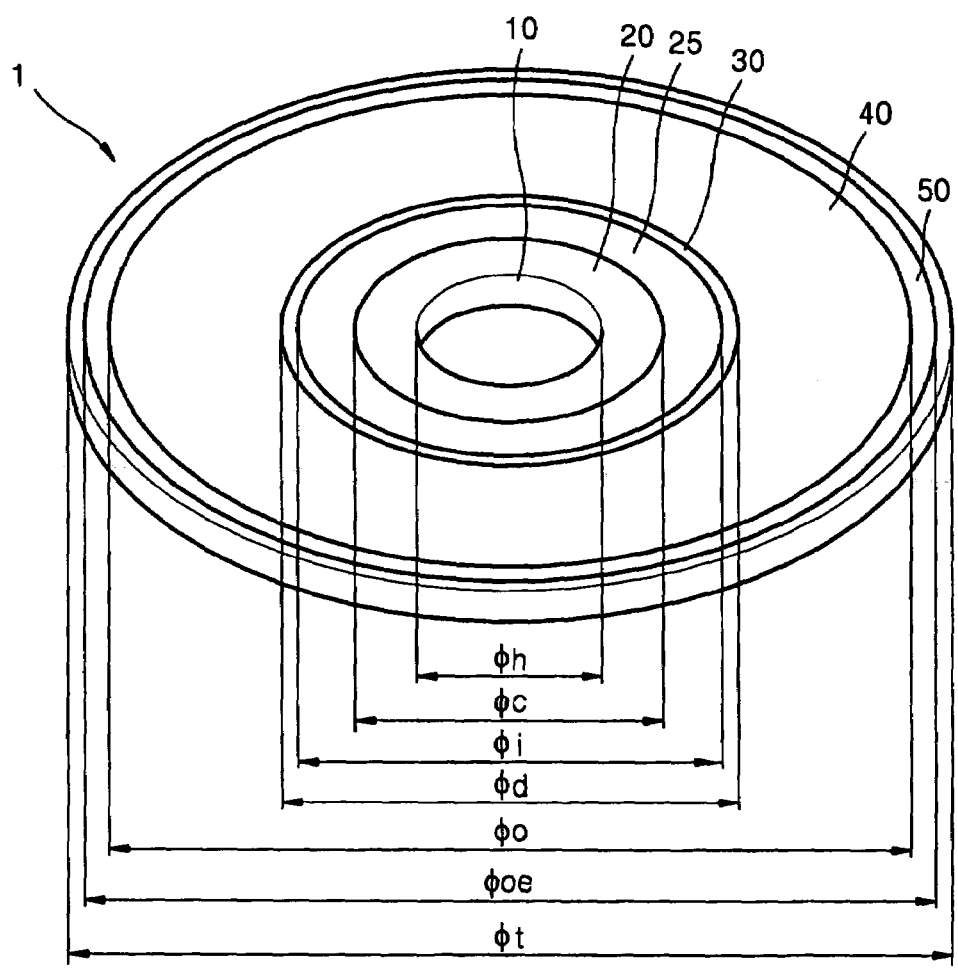
FIG. 1 is a perspective view of a conventional disc.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 8:
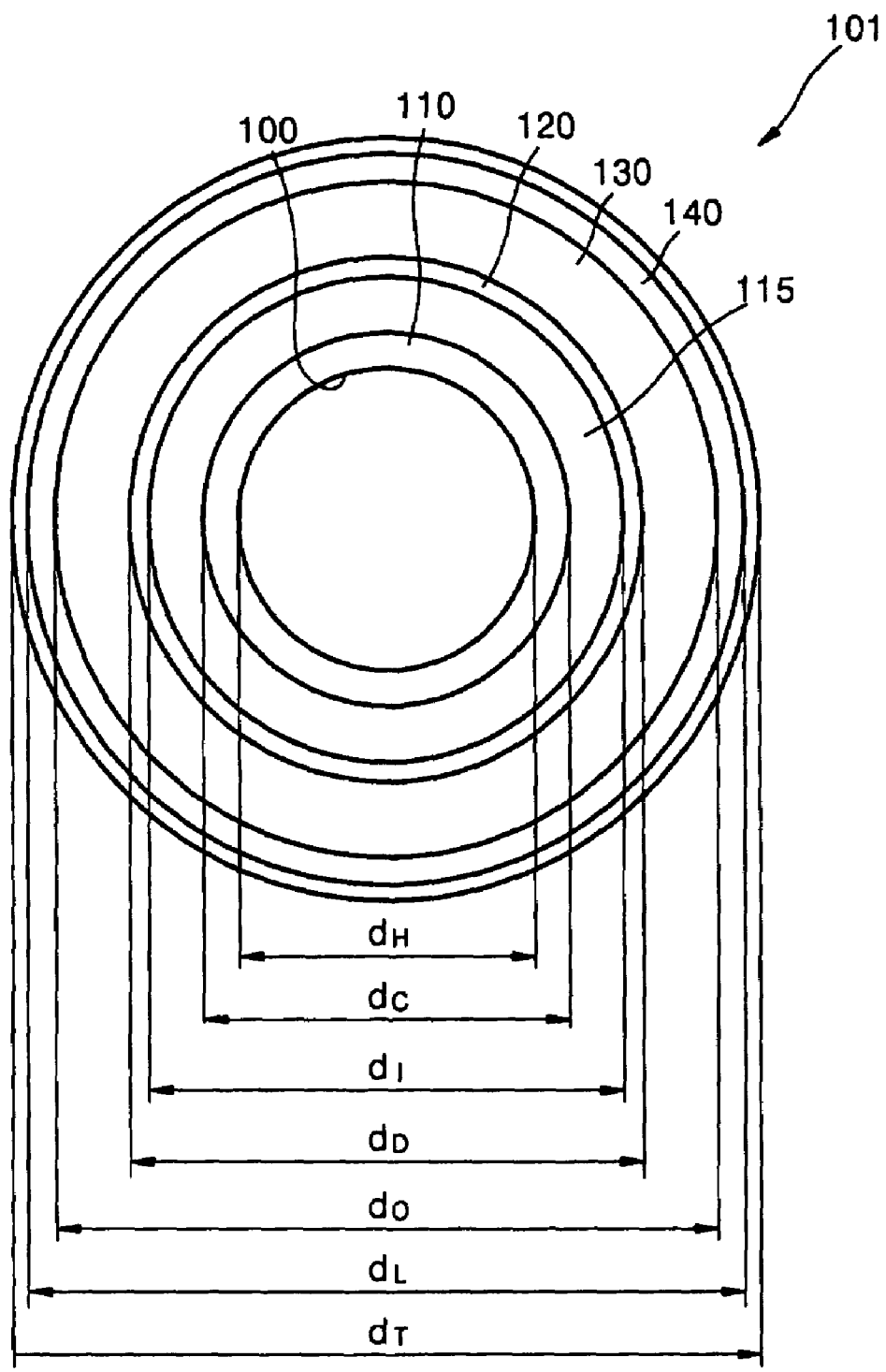
FIG. 8 is a plan view of a high density disc according to an embodiment of the present invention.

Referring to FIG. 8, a high density disc according to an embodiment of the present invention includes a center hole 100, a clamping area 110 wherein a clamping force is applied, a data area 130 where user data is recorded, a lead-in area 120 close to the inner side of the data area 130, and a lead-out area 140 close to the outer side of the data area 130. Here, recording of data begins from the lead-in area 120.

When the diameter of the center hole 100 is dH, dH can be set to be 10 mm or more. Preferably, the diameter of the center hole 100 is set to 15 mm considering the compatibility of a conventional disc drive. The size of the clamping area 110 is reduced to a minimum to secure a high density recording capacity of the high density disc. However, even when the size of the clamping area 110 is reduced, a recording and/or reproducing feature of the high density disc must be maintained or improved. The recording and/or reproducing feature most affected by the size of the clamping area 110 is a vibration feature of the high density disc during rotation of the disc. That is, as the clamping area 110 decreases, more data area can be secured. However, the vibration feature of the high density disc deteriorates so that recording and/or reproducing of the disc may receive a bad influence. Accordingly, to set a preferable clamping area 110, the vibration feature of a disc during rotation of the disc is measured while changing the size of the clamping area 110, a clamping force applied to the clamping area 110, and a disc rotation speed.

Figure 2:
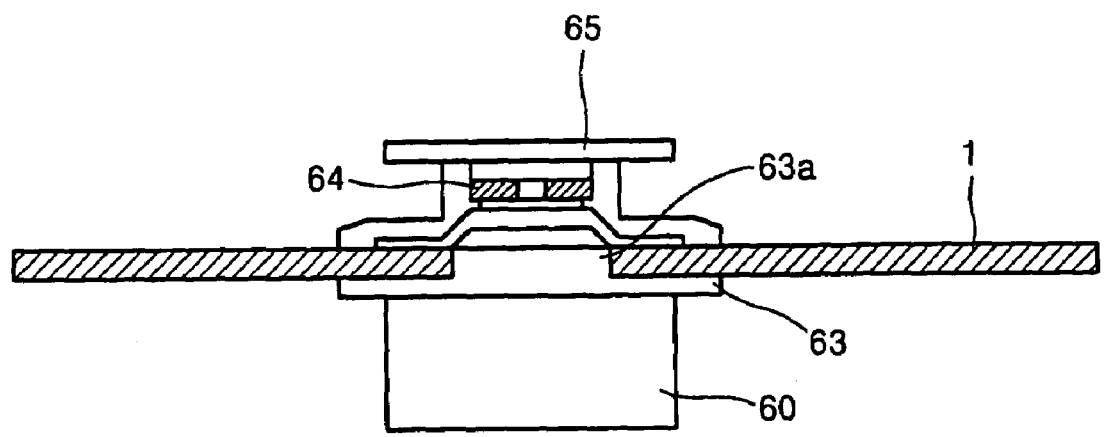
FIG. 2 is a sectional view schematically illustrating a state in which a high density disc is clamped in a disc drive.

FRF RMS, the first resonance frequency, and amplitude are tested while changing a clamping force to 2.5 N, 3.5 N and 4.5 N, respectively, with respect to cases in which the outer diameter dC of the clamping area 110 is 20<dC<23, 23<dC<26, and 26<dC<29 (in millimeters (mm)). FRF (frequency response function) RMS shows a ratio of an output acceleration with respect to an input acceleration by RMS (root mean square) to indicate the amount of the overall vibration during rotation of a disc. Also, the cases in which the rotational frequency of the spindle motor (60 of FIG. 2) is 20 Hz, 60 Hz, or 100 Hz are tested. The results of the tests are illustrated in Tables 1, 2, and 3 for the cases in which the diameter of the clamping area 110 is 20<dC<23, 23<dC<26, and 26<dC<29, respectively.

TABLE 2

| Clamping Area (mm) | Rotational Frequency | Measured Value | 2.5 N Damper | 2.5 N Disc | 3.5 N Damper | 3.5 N Disc | 4.5 N Damper | 4.5 N Disc |
|---|---|---|---|---|---|---|---|---|
| 20 < dC < 23 | 20 Hz | First Resonance Frequency | 29.3 | 102.6 | 29.6 | 113.9 | 29.6 | 109.7 |
| | | Amplitude | 5.8 | 3.9 | 5.8 | 3.7 | 5.7 | 4.5 |
| | | FRF RMS | 27.4 | | 26.4 | | 27.4 | |
| | 60 Hz | First Resonance Frequency | 29.8 | 115.0 | 30.1 | 121.7 | 29.3 | 119.4 |
| | | Amplitude | 6.1 | 5.5 | 6.0 | 5.4 | 5.7 | 6.5 |
| | | FRF RMS | 28.4 | | 28.3 | | 29.0 | |
| | 100 Hz | First Resonance Frequency | 29.3 | 136.4 | 29.6 | 140.4 | 29.6 | 137.7 |
| | | Amplitude | 6.2 | 5.4 | 6.0 | 6.2 | 6.1 | 6.4 |
| | | FRF RMS | 30.8 | | 32.4 | | 31.9 | |

TABLE 3

| Clamping Area (mm) | Rotational Frequency | Measured Value | 2.5 N Damper | 2.5 N Disc | 3.5 N Damper | 3.5 N Disc | 4.5 N Damper | 4.5 N Disc |
|---|---|---|---|---|---|---|---|---|
| 23 < dC < 26 | 20 Hz | First Resonance Frequency | 29.8 | 110.7 | 29.8 | 117.2 | 30.4 | 115.0 |
| | | Amplitude | 5.5 | 4.5 | 5.6 | 4.2 | 5.7 | 5.1 |
| | | FRF RMS | 27.0 | | 26.1 | | 27.4 | |
| | 60 Hz | First Resonance Frequency | 30.1 | 120.6 | 31.0 | 127.7 | 30.1 | 124.1 |
| | | Amplitude | 6.2 | 5.6 | 6.0 | 5.4 | 6.3 | 7.9 |
| | | FRF RMS | 29.6 | | 28.7 | | 30.8 | |

TABLE 3-continued

| Clamping Area (mm) | Rotational Frequency | Measured Value | 2.5 N Damper | 2.5 N Disc | 3.5 N Damper | 3.5 N Disc | 4.5 N Damper | 4.5 N Disc |
|---|---|---|---|---|---|---|---|---|
| | 100 Hz | First Resonance Frequency | 29.8 | 144.4 | 30.1 | 147.2 | 30.1 | 143.1 |
| | | Amplitude | 6.0 | 6.1 | 5.9 | 8.4 | 6.0 | 8.3 |
| | | FRF RMS | 31.3 | | 31.5 | | 33.3 | |

TABLE 4

| Clamping Area (mm) | Rotational Frequency | Measured Value | 2.5 N Damper | 2.5 N Disc | 3.5 N Damper | 3.5 N Disc | 4.5 N Damper | 4.5 N Disc |
|---|---|---|---|---|---|---|---|---|
| 26 < dC < 29 | 20 Hz | First Resonance Frequency | 29.3 | 115.0 | 29.6 | 121.7 | 29.3 | 119.4 |
| | | Amplitude | 5.4 | 4.5 | 5.2 | 4.35 | 5.3 | 4.1 |
| | | FRF RMS | 26.3 | | 26.0 | | 25.9 | |
| | 60 Hz | First Resonance Frequency | 31.0 | 126.5 | 30.4 | 128.9 | 29.8 | 132.6 |
| | | Amplitude | 5.5 | 7.4 | 5.6 | 5.7 | 5.7 | 4.8 |
| | | FRF RMS | 28.4 | | 28.3 | | 29.0 | |
| | 100 Hz | First Resonance Frequency | 29.3 | 150.0 | 29.0 | 153.0 | 29.3 | 151.5 |
| | | Amplitude | 6.6 | 6.3 | 6.5 | 7.1 | 6.6 | 8.3 |
| | | FRF RMS | 38.6 | | 35.9 | | 37.2 | |

Figure 3:
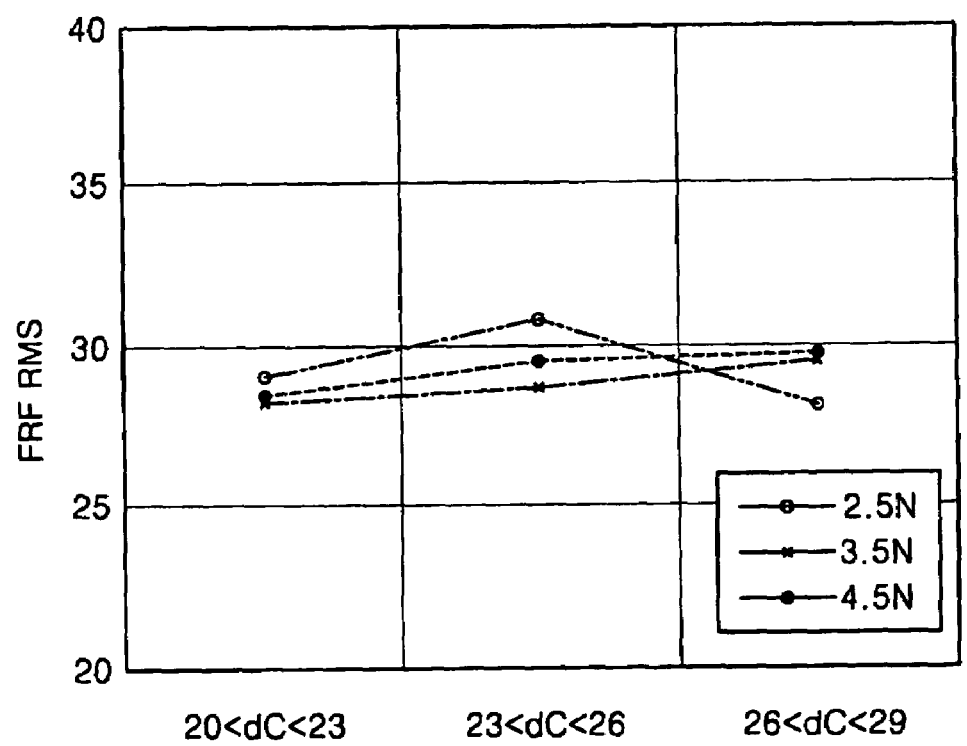
FIG. 3 is a graph illustrating FRF RMS values according to the size of a clamping area of a high density disc by a clamping force.
Figure 4:
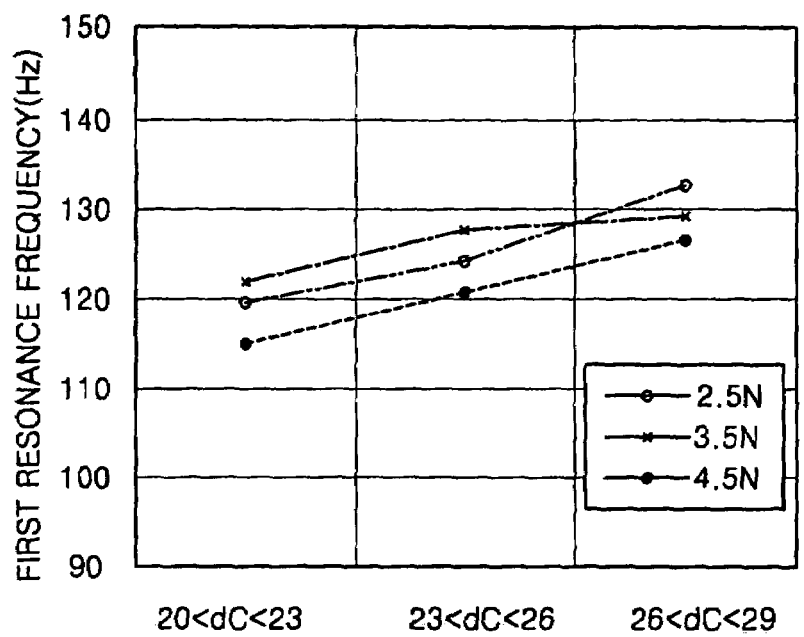
FIG. 4 is a graph illustrating a first resonance frequency according to the size of a clamping area of a high density disc by a clamping force.

FIG. 3 is a graph illustrating the measured values of FRF with respect to the cases in which the diameter of the clamping area 110 is 20<dC<23, 23<dC<26, and 26<dC<29 when the rotational frequency of a disc is 60 Hz (3600 r.p.m.). FIG. 4 is a graph illustrating changes in the first resonance frequency with respect to the cases in which the diameter of the clamping area 110 is 20<dC<23, 23<dC<26, and 26<dC<29 when the rotational frequency of a disc is 60 Hz (3600 r.p.m.). In the above tests, a clamping force is set within a range in which the disc does not slip or escape at a rotational speed used.

According to the results of the measurements of a vibration feature affecting a disc, the vibration feature is not greatly affected even when the outer diameter of the clamping area is reduced to within a range of 20–29 mm. Referring to FIG. 3, the measured value of FRF RMS shows substantially no significant difference according to a change of the clamping area 110, and appears to be superior when a clamping force is 3.5 N. Also, referring to FIG. 4, as the size of the clamping area decreases, the first resonance frequency of the high density disc decreases slightly. It can be seen that there is almost no difference according to a change of the clamping force. According to the above results, the FRF RMS value and the first resonance frequency of the high density disc are greatly affected with a change in the rotational frequency of the spindle motor, but not greatly affected with a change in the size of the clamping area at the same rotational frequency. Such an amount of change hardly affects a recording and/or reproducing feature of the high density disc.

Figure 5A:
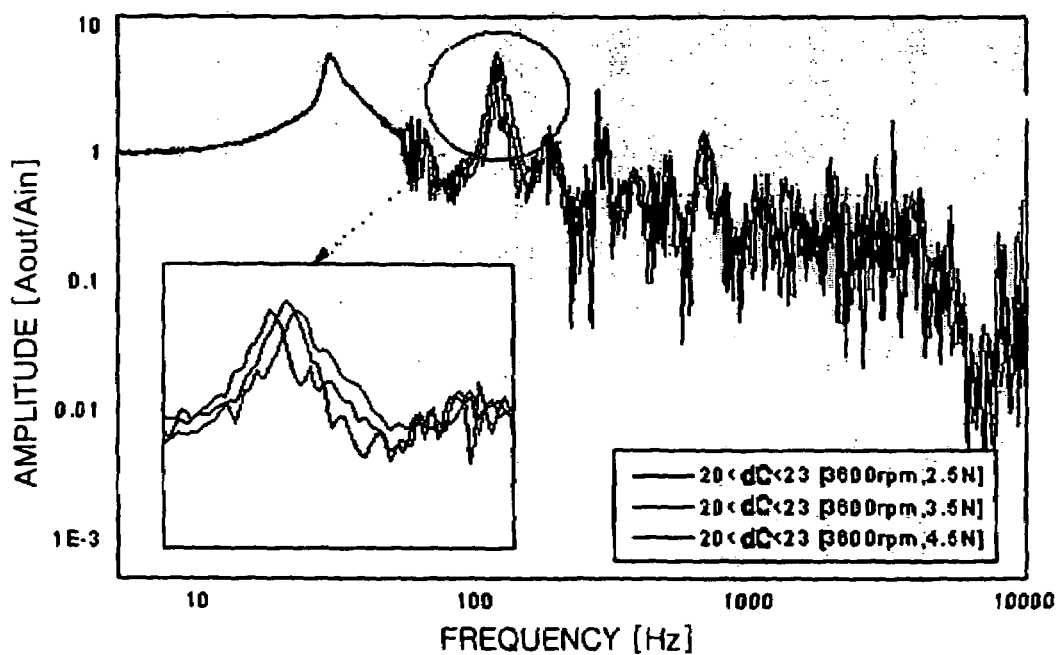
FIGS. 5A, 5B, and 5C are graphs illustrating amplitudes according to the rotational frequency of a spindle motor by the size of a clamping area while changing a clamping force of a high density disc.
Figure 5B:
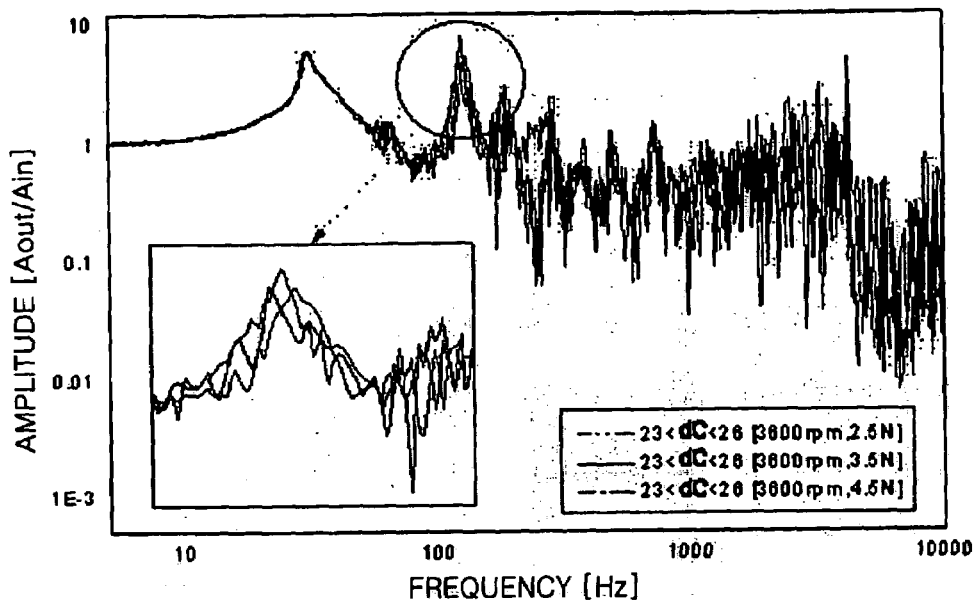
Figure 5C:
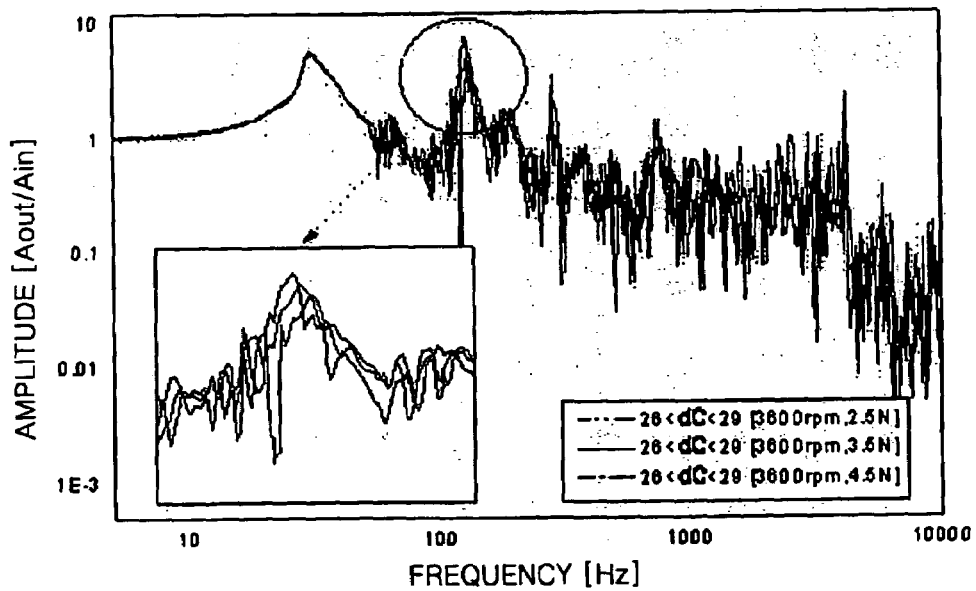

Next, providing a test for the amplitude of the high density disc, an amplitude through sign sweep vibration excitation is measured within a range of frequencies between 5–10 kHz with respect to the same clamping area and the same rotation speed of a spindle motor. The results of the measurements are illustrated in a graph according to a clamping force. FIGS. 5A, 5B, and 5C illustrate the cases in which the outer diameter of the clamping area is 20<dC<23, 23<dC<26, and 26<dC<29, respectively. In particular, a magnified portion around 100 Hz which is the first resonance frequency of an optical disc, is provided in each drawing. It can be seen that there is no substantial difference according to the clamping force.

Figure 6A:
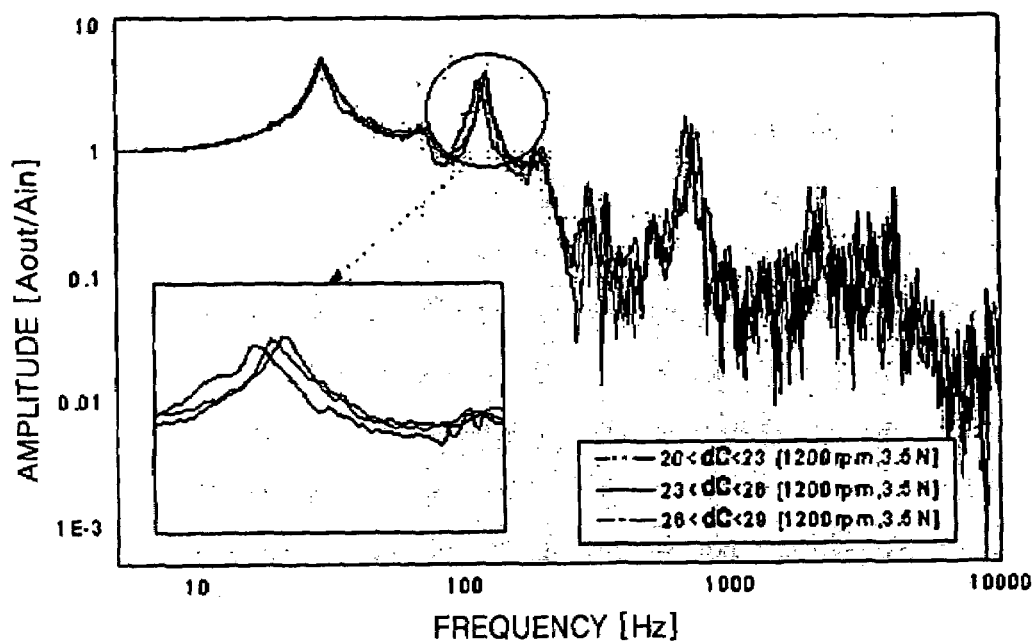
FIGS. 6A, 6B, and 6C are graphs showing amplitudes according to the rotational frequency of a spindle motor by rotation speed while changing the size of a clamping area of a high density disc.
Figure 6B:
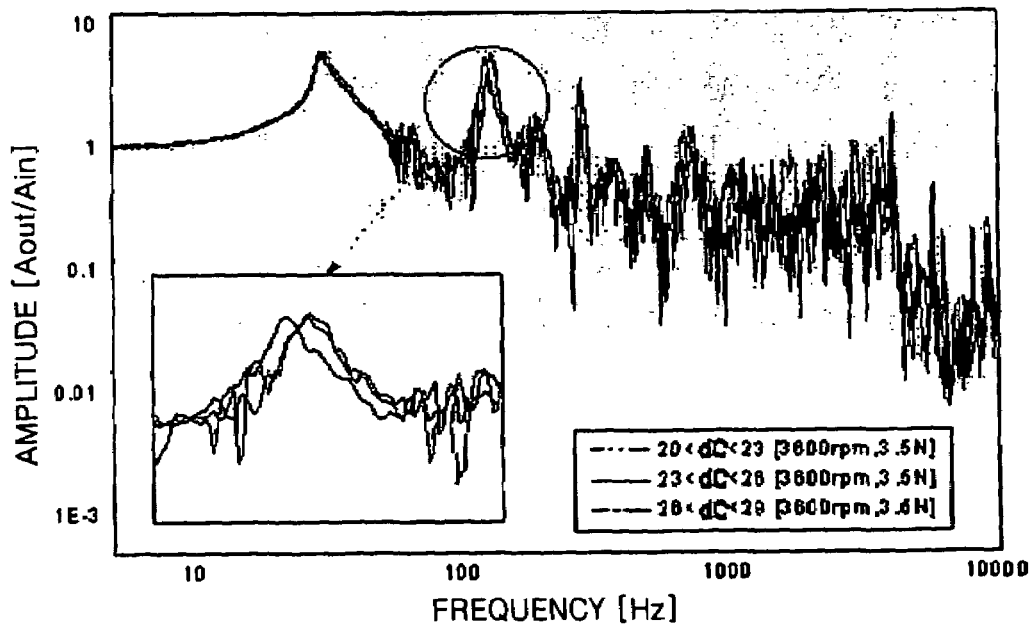
Figure 6C:
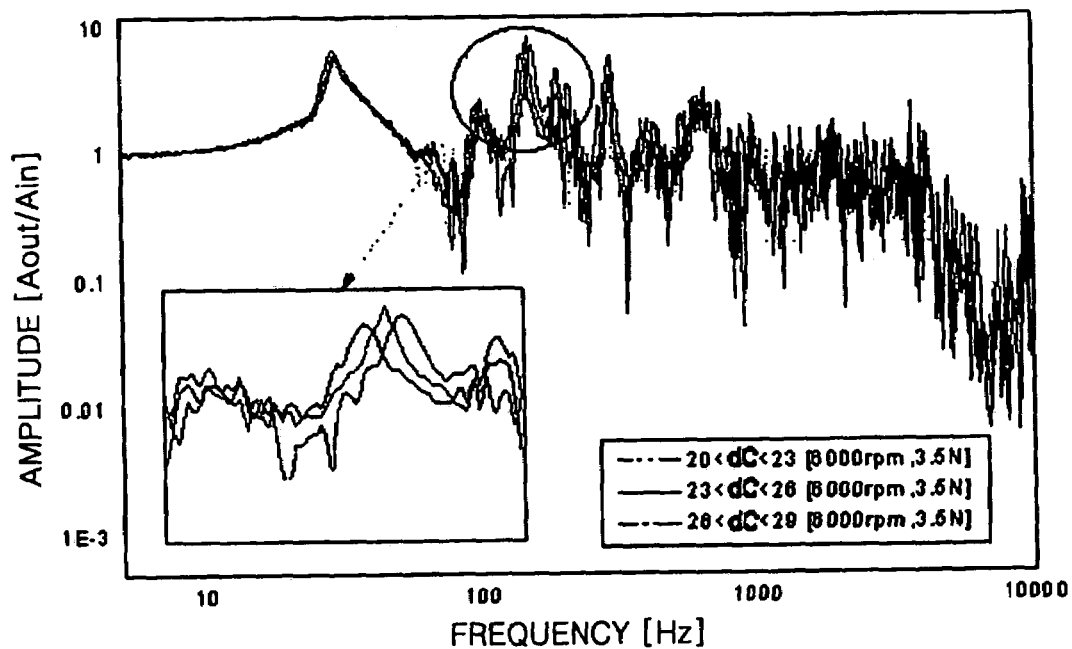

Next, an amplitude through sine sweep vibration excitation is illustrated by the size of the clamping area within a range of frequency of 5–10 kHz with respect to the same disc rotation speed and the same clamping force. FIG. 6A illustrates the case in which the rotation speed is 1,200 r.p.m. and the clamping force is 3.5 N. FIG. 6B illustrates the case in which the rotation speed is 3,600 r.p.m. and the clamping force is 3.5 N. FIG. 6C illustrates the case in which the rotation speed is 6,000 r.p.m. and the clamping force is 3.5 N. Here, a magnified portion around 100 Hz, which is the first resonance frequency of an optical disc, is provided in each drawing. It can be seen that there is not substantial difference according to the clamping area, and that the amplitude is within an allowable range.

Figure 7A:
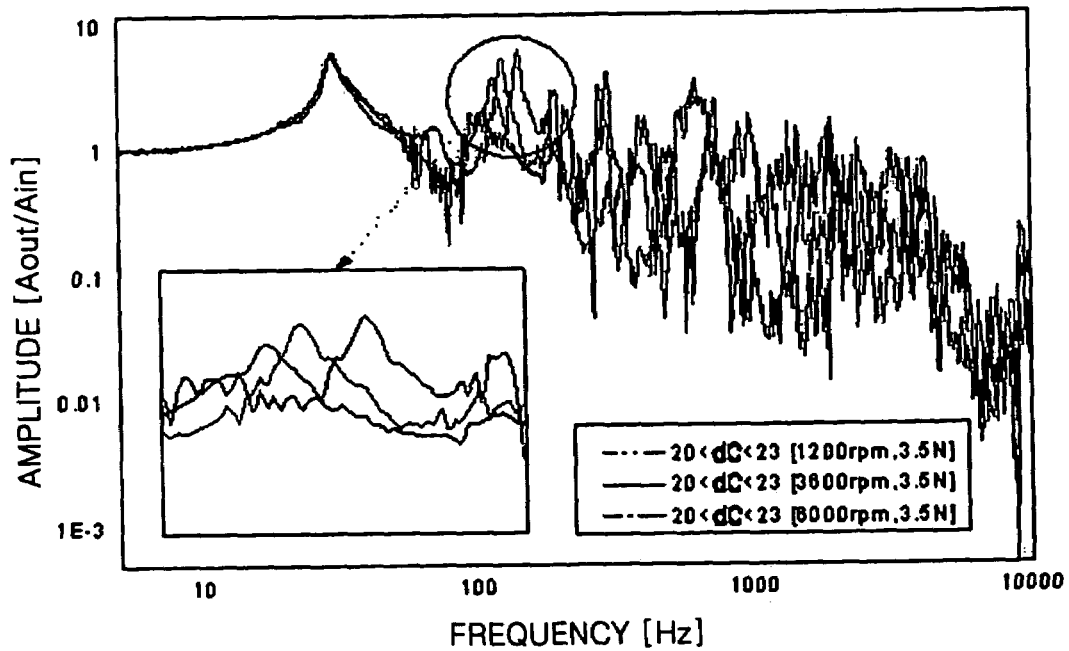
FIGS. 7A, 7B, and 7C are graphs illustrating amplitudes according to the rotational frequency of a spindle motor by the size of a clamping area while changing the rotation speed of a high density disc.
Figure 7B:
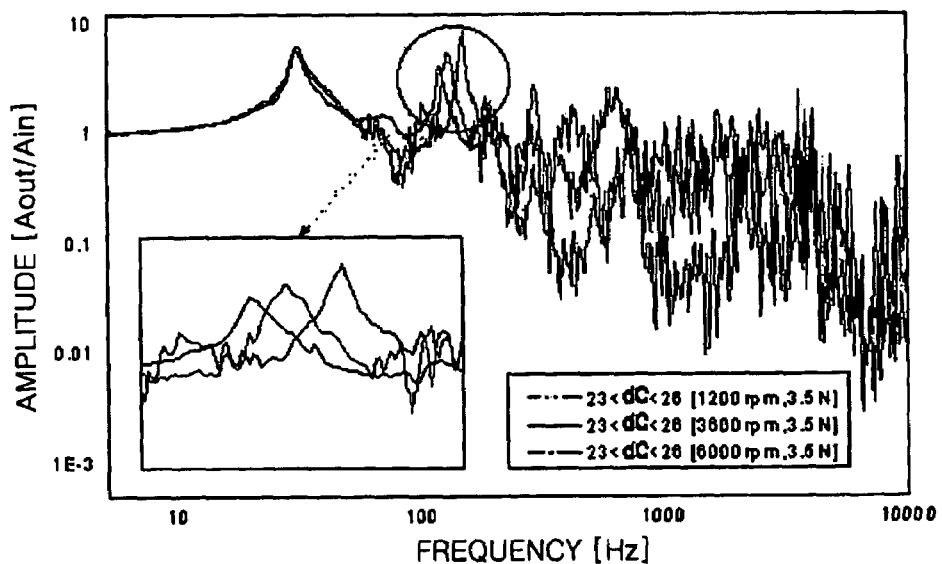
Figure 7C:
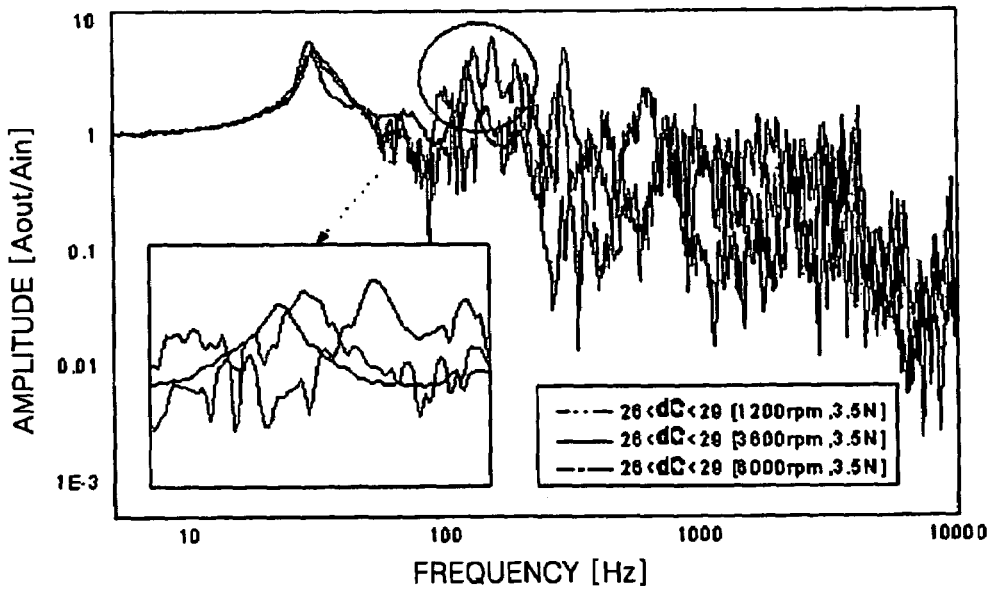

Next, an amplitude through sine sweep vibration excitation is illustrated by the size of the clamping area within a range of a frequency of 5–10 KHz with respect to the same clamping area and the same clamping force. FIG. 7A illustrates the case in which the size of the clamping area is such that 20<dC<23 and the clamping force is 3.5 N. FIG. 7B illustrates the case in which the size of the clamping area is such that 23<dC<26 and the clamping force is 3.5 N. FIG. 7C illustrates the case in which the size of the clamping area is such that 26<dC<29 and the clamping force is 3.5 N. Here, the measured value of FRF according to a change in rotation speed of a disc shows a slight difference. However, this difference is due to the disc rotation speed of an optical recording and/or reproducing apparatus, rather than the difference in the clamping area and the clamping force. Thus, based on the above test results, the outer diameter (dC) of the clamping area 110 can be set within a range of 20–26 mm, and preferably 23–26 mm. Accordingly, the inner diameter (dI) where the lead-in area 120 starts and the inner diameter (dD) where the data area 130 starts can be reduced to 33–36 mm and 35–40 mm, respectively. By applying these conditions in common, the outer diameter (dO) of the data area 130, which is a boundary between the data area 130 and the lead-out area 120, is restricted to 62–64 mm, 76–79 mm, or 116–119 mm so that a high density disc having the overall diameter of 65 mm, 80 mm, or 120 mm can be realized.

Next, an embodiment of the present invention will now be described in detail.

A high density disc 101 according to an embodiment of the present invention, as illustrated in FIG. 8, includes a center hole 100, a clamping area 110, a lead-in area 120, a user data area 130, and a lead-out area 140. The diameter (dH) of the center hole 100 is 15 mm. The diameter (dC) of the clamping area 110 is 23–26 mm. The diameter (dI) of the lead-in area 120 is 33–36 mm. The diameter (dD) of the data area 130 is 36–116 mm. The diameter (dO) of the lead-out area 140 is 116–118 mm. The overall diameter (dT) of the disc 101 is 120 mm.

Here, a non-recording area 115 is provided between the clamping area 110 and the lead-in area 120, which has a stack ring (not shown) to prevent deterioration in productivity due to contact of a disc recording surface when manufactured discs are stacked during an injection process of a disc.

Figure 9:
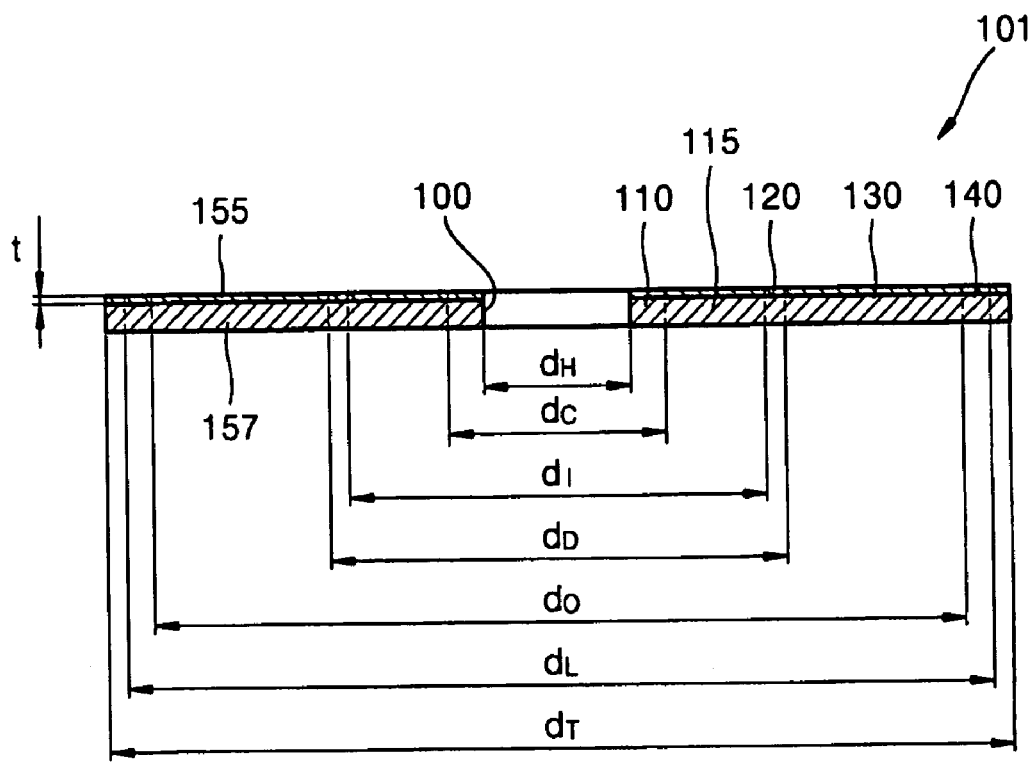
FIG. 9 is a sectional view schematically illustrating a high density disc according to the embodiment of FIG. 8.

FIG. 9 illustrates a profile of a high density disc. Referring to FIG. 9, the high density disc includes at least one transparent substrate 155 and at least one recording layer 157. The thickness (t) of the transparent substrate 155 may be 0.2 mm or less. In particular, when the thickness of the transparent substrate 155 is 0.1 mm, considering the compatibility with the same drive to record and/or reproduce conventional CDs or DVDs, a polycarbonate disc having a thickness of 1.1 mm is preferably used as a reinforcement plate, thus making the disc have a 1.2 mm thickness. As a method of manufacturing a 0.1 mm transparent substrate, there is a method of performing spin-coating on a polycarbonate disc having a thickness of 1.1 mm to have a sheet thickness of 0.1 mm, and a method of combining the 0.1 mm thick sheet with the polycarbonate disc by UV curing. This disc may be a phase change disc or a magneto-optical disc.

Figure 10:
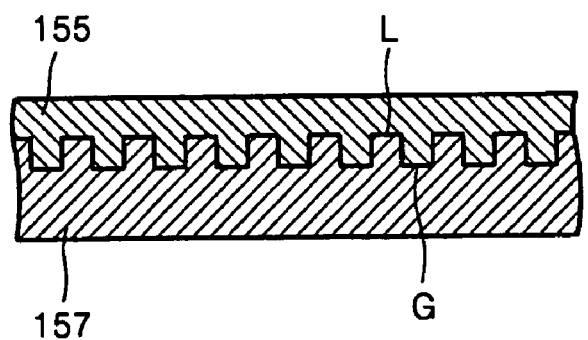
FIG. 10 is a sectional view illustrating part of the high density disc according to the embodiment of FIG. 8.

As illustrated in FIG. 10, a land track L and a groove track G are formed on at least one of the transparent substrate 155 and the recording layer 157. Data can be recorded on at least one of the land track L and the groove track G. Multi-layer recording is possible on the transparent substrate 155 and the recording layer 157. As a method of increasing recording density of the high density disc, there is a method of narrowing a track pitch, which is an interval between tracks, and a method of reducing a minimum mark length (MML).

However, the track pitch or the MML can be changed according to the design of error correction code (ECC) and modulation. For example, when data is recorded on the land L and the groove G, the track pitch is 0.6 µm or less and the LLM is 0.22 µm or less. When data is recorded on the groove G, the track pitch is 0.35 µm or less and the MML is 0.22 µm or less. Also, an objective lens having an NA of 0.85 and a laser diode having a wavelength of 400 nm are used in an optical pickup (not shown) to record and/or reproduce a high density disc.

When data is recorded on the high density disc according to the embodiment of FIGS. 8 and 9 under the above conditions, a recording capacity of 25 GB is secured with respect to a single side disc where only one side is recorded.

A high density disc 101 according to another embodiment of the present invention includes a center hole 100, a clamping area 110, a lead-in area 120, a user data area 130, and a lead-out area 140. The diameter (dH) of the center hole 100 is 15 mm. The diameter (dC) of the clamping area 110 is 23–26 mm. The diameter (dI) of the lead-in area 120 is 33–36 mm. The diameter (dD) of the data area 130 is 36–76 mm. The diameter (dO) of the lead-out area 140 is 76–78 mm. The overall diameter (dT) of the disc 101 is 80 mm.

In this case, the NA of an objective lens, the wavelength of a laser diode, the track pitch and the minimum mark length, which are the same as those in the above-described embodiment, may be applied. A recording capacity of 7.8 GB can be secured with respect to a single side. Thus, the recording capacity of the high density disc according to this embodiment considerably increases compared to a conventional disc having the same diameter.

A high density disc according to another embodiment of the present invention includes a center hole 100, a clamping area 110, a lead-in area 120, a user data area 130, and a lead-out area 140. The diameter (dH) of the center hole 100 is 15 mm. The diameter (dC) of the clamping area 110 is 23–26 mm. The diameter (dI) of the lead-in area 120 is 33–36 mm. The diameter (dD) of the data area 130 is 35–40 mm. When the inner diameter (dD) of the data area 130 is 36 mm, the outer diameter (dO) may be within a range of 39–44 mm. When the inner diameter (dD) of the data area 130 is 40 mm, the outer diameter (dO) may be within a range of 42–48 mm.

Further, the diameter (dH) of the center hole 100 may be 15 mm, the diameter (dC) of the clamping area 110 may be 23–26 mm, the diameter (dI) of the lead-in area 120, may be 33–36 mm, the diameter (dD) of the data area 130 may be 36–42 mm, the diameter (dO) of the lead-out area 140 may be 42–44 mm, and the overall diameter (dT) of the disc 101 may be 45 mm. Here, when the NA of the objective lens of an optical pickup is 0.85, the wavelength of a laser diode is 400 nm, the track pitch in a land and groove recording method is 0.6 µm or less, and the minimum mark length is 0.22 µm or less, and a recording capacity of 650 MB is secured with respect to a single side of the high density disc.

Thus, a small disc having an overall diameter (dT) of 45 mm and simultaneously having a recording capacity of about 650 MB, which is the recording capacity of a conventional CD, can be secured.

The specifications of the high density disc according to the above embodiments of the present invention are shown in Table 5.

TABLE 5

|  | Specifications | | |
|---|---|---|---|
| Diameter of disc (mm) | 120 | 80 | 45 |
| Lead-out area (mm) | 116–118 | 76–78 | 42–44 |
| Data area (mm) | 36–40 | 36–76 | 36–42 |
| Lead-in area (mm) | 33–36 | 33–36 | 33–36 |
| Clamping area (mm) | 23–26 | 23–26 | 23–26 |
| Center hole (mm) | 15 | 15 | 15 |
| Recording capacity (GB) | 25 | 7.8 | 0.65 |

TABLE 5-continued

| | Specifications | | |
|---|---|---|---|
| Wavelength (nm) | 400 | 400 | 400 |
| NA of objective lens (NA) | 0.85 | 0.85 | 0.85 |
| Track pitch (L/G, /G recording) (μm) | 0.3/0.325 | 0.3/0.325 | 0.3/0.325 |
| Minimum mark length (L/G, /G recording) (μm) | 0.214/0.197 | 0.213/0.197 | 0.213/0.197 |

Figure 11:
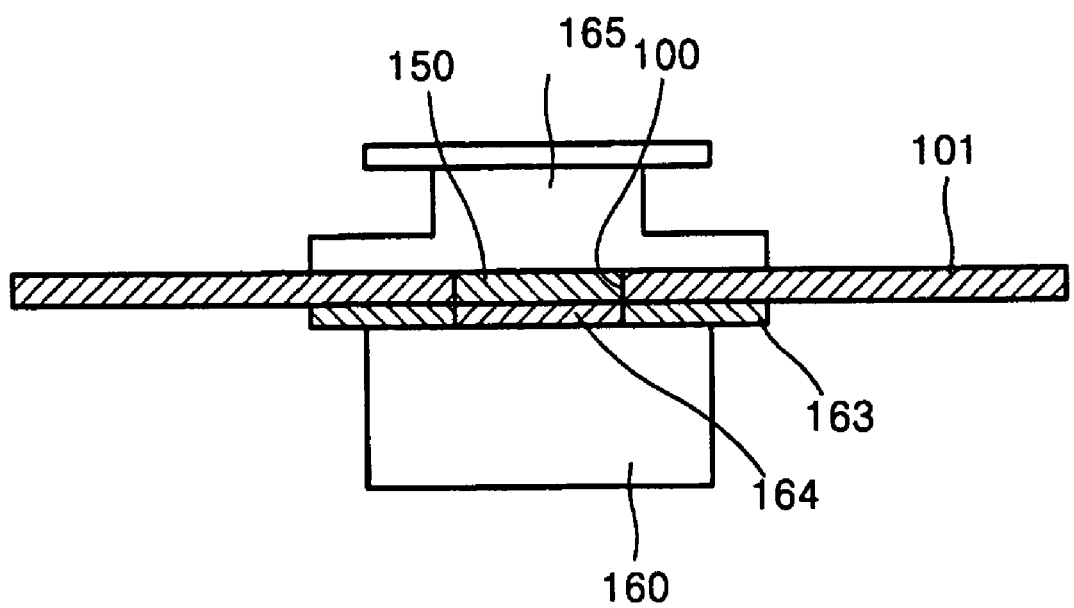
FIG. 11 is a sectional view illustrating a state in which a high density disc according to another embedment of the present invention is loaded in a disc drive.

Meanwhile, when the high density disc is installed on a turntable (63 of FIG. 2), the protruding portion 63a of the turntable 63 is inserted in the center hole 100 so that the disc can be stably loaded. However, as illustrated in FIG. 11, a metal plate 150 can be inserted in the center hole 100. In this case, since a magnetic body 164 is provided at a turntable 163 and the metal plate 150 is attracted by the magnetic body 164, the disc can be stably installed at the turntable 163. When the disc is accommodated on the turntable 163, the disc is pressed by a clamping member 165 so that the disc is fixed. When the metal plate 150 is provided in the center hole 100 of the disc, since there is no need to provide the clamping member 165 with an additional metal member, a disc drive apparatus can be made slim. Here, reference numeral 160 denotes a spindle motor.

The high density discs according to the embodiments of the present invention make the diameter of a center hole of the disc of 15 mm compatibly used in a conventional optical disc drive, and newly specify the clamping area and the data area to secure a recording capacity of the discs while maintaining a recording and/or reproducing feature of the discs. Accordingly, a high density recording capacity, as well as convenient portability can be obtained by decreasing the size of the high density disc while using the conventional disc drive.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A high density disc comprising:
   a center hole having a diameter of 10 mm or more;
   a clamping area;
   a data area where user data is recorded;
   a lead-in area located at an inner side of the data area; and
   a lead-out area located at an outer side of the data area,
      wherein an inner diameter of the clamping area is within a range of 20–26 mm, and wherein an inner diameter of the lead-in area is within a range of 33–36 mm.

2. The high density disc according to claim 1, wherein an inner diameter of the data area is within a range of 35–40 mm.

3. The high density disc according to claim 2, wherein, when the inner diameter of the data area is 36 mm, and the outer diameter thereof is within a range of 39–44 mm.

4. The high density disc according to claim 2, wherein, when the inner diameter of the data area is within 40 mm, the outer diameter thereof is within a range of 42–48 mm.

5. The high density disc according to claim 2, wherein the high density disc comprises:
   at least one transparent substrate; and
   at least one recording layer,
   wherein the thickness of the transparent substrate is 0.2 mm or less.

6. The high density disc according to claim 2, wherein a boundary between the data area and the lead-out area is within a range of 62–64 mm.

7. The high density disc according to claim 2, wherein a boundary between the data area and the lead-out area is within a range of 76–79 mm.

8. The high density disc according to claim 2, wherein a boundary between the data area and the lead-out area is within a range of 116–119 mm.

9. The high density disc according to claim 2, wherein a metal plate is inserted into the center hole.

10. The high density disc according to claim 1, wherein the high density disc comprises a groove track and a land track, wherein recording is performed on at least one of the groove track and land track.

11. A high density disc comprising:
    a center hole having a diameter of more than 10 mm;
    a clamping area;
    a data area where user data is recorded;
    a lead-in area located at an inner side of the data area; and
    a lead-out area located at an outer side of the data area,
       wherein, when the inner diameter of the data area is 36 mm, the outer diameter thereof is within a range of 39–44 mm.

12. A high density disc comprising:
    a center hole having a diameter of more than 10 mm;
    a clamping area;
    a data area where user data is recorded;
    a lead-in area located at an inner side of the data area; and
    a lead-out area located at an outer side of the data area,
       wherein, when the inner diameter of the data area is 40 mm, the outer diameter thereof is within a range of 42–48 mm.

13. The high density disc according to claim 11, wherein a boundary between the data area and the lead-out area is within a range of 62–64 mm.

14. The high density disc according to claim 11, wherein a boundary between the data area and the lead-out area is within a range of 76–79 mm.

15. The high density disc according to claim 11, wherein a boundary between the data area and the lead-out area is within a range of 116–119 mm.

16. The high density disc according to claim 11, wherein a metal plate is inserted into the center hole.

17. The high density disc according to claim 11, wherein the high density disc comprises:
    at least one transparent substrate; and
    at least one recording layer, wherein the thickness of the transparent substrate is 0.2 mm or less.

18. The high density disc according to claim 11, wherein the high density disc comprises a groove track and a land track, wherein recording can be performed on at least one of the groove track and land track.

19. A high density disc comprising:
    a center hole having a diameter of 10 mm or more;
    a clamping area;
    a data area where user data is recorded;
    a lead-in area located at an inner side of the data area; and
    a lead-out area located at an outer side of the data area,
       wherein the clamping area is within a range of 23–26 mm in diameter and the lead-in area is within a range of 33–36 mm in diameter.

20. The high density disc according to claim 19, wherein the data area is within a range of 36–116 mm in diameter and the lead-out area is within a range of 116–118 mm in diameter.

21. The high density disc according to claim 19, wherein the data area is within a range of 36–76 mm in diameter and the lead-out area is within a range of 76–78 mm in diameter.

22. The high density disc according to claim 19, wherein the data area is within a range of 36–42 mm in diameter and the lead-out area is within a range of 42–44 mm in diameter.

23. The high density disc according to claim 20, wherein the high density disc comprises:
a groove track; and
a land track,
wherein recording can be performed on at least one of the groove track and the land track.

24. The high density disc according to claim 23, wherein, when recording is performed at the groove track, a track pitch is 0.35 µm or less.

25. The high density disc according to claim 24, wherein a minimum mark length recorded at the groove track is 0.22 µm or less.

26. The high density disc according to claim 23, wherein, when recording is performed at the groove track and land track, a track pitch is 0.6 µm or less.

27. The high density disc according to claim 26, wherein a minimum mark length recorded at the groove track and land track is 0.22 µm or less.

28. The high density disc according to claim 20, wherein the high density disc comprises at least one transparent substrate; and
at least one recording layer, wherein the thickness of the transparent substrate is 0.2 mm or less.

29. The high density disc according to claim 1, wherein a metal plate is inserted into the center hole.

30. The high density disc according to claim 1, wherein the high density disc comprises:
a groove track; and
a land track,
wherein recording is performed on at least one of the groove track and land track.

31. The high density disc according to claim 3, wherein a metal plate is inserted into the center hole.

32. The high density disc according to claim 3, wherein the high density disc comprises:
a groove track; and
a land track, wherein recording is performed on at least one of the groove track and land track.

33. The high density disc according to claim 4, wherein a metal plate is inserted into the center hole.

34. The high density disc according to claim 4, wherein the high density disc comprises:
a groove track; and
a land track,
wherein recording is performed on at least one of the groove track and land track.

35. The high density disc according to claim 4, wherein a metal plate is inserted into the center hole.

36. The high density disc according to claim 5, wherein the high density disc comprises:
a groove track; and
a land track,
wherein recording is performed on at least one of the groove track and land track.

37. The high density disc according to claim 6, wherein a metal plate is inserted into the center hole.

38. The high density disc according to claim 6, wherein the high density disc comprises a groove track and a land track, wherein recording is performed on at least one of the groove track and land track.

39. The high density disc according to claim 7, wherein a metal plate is inserted into the center hole.

40. The high density disc according to claim 7, wherein the high density disc comprises a groove track and a land track, wherein recording is performed on at least one of the groove track and land track.

41. The high density disc according to claim 8, wherein a metal plate is inserted into the center hole.

42. The high density disc according to claim 8, wherein the high density disc comprises a groove track and a land track, wherein recording is performed on at least one of the groove track and land track.

43. The high density disc according to claim 11, wherein a boundary between the data area and the lead-out area is within a range of 62–64 mm.

44. The high density disc according to claim 11, wherein a boundary between the data area and the lead-out area is within a range of 76–79 mm.

45. The high density disc according to claim 11, wherein a boundary between the data area and the lead-out area is within a range of 116–119 mm.

46. The high density disc according to claim 11, wherein a metal plate is inserted into the center hole.

47. The high density disc according to claim 11, wherein the high density disc comprises:
at least one transparent substrate; and
at least one recording layer, wherein the thickness of the transparent substrate is 0.2 mm or less.

48. The high density disc according to claim 11, wherein the high density disc comprises a groove track and a land track, wherein recording can be performed on at least one of the groove track and land track.

49. The high density disc according to claim 12, wherein a boundary between the data area and the lead-out area is within a range of 62–64 mm.

50. The high density disc according to claim 12, wherein a boundary between the data area and the lead-out area is within a range of 76–79 mm.

51. The high density disc according to claim 12, wherein a boundary between the data area and the lead-out area is within a range of 116–119 mm.

52. The high density disc according to claim 12, wherein a metal plate is inserted into the center hole.

53. The high density disc according to claim 12, wherein the high density disc comprises:
at least one transparent substrate; and
at least one recording layer, wherein the thickness of the transparent substrate is 0.2 mm or less.

54. The high density disc according to claim 12, wherein the high density disc comprises a groove track and a land track, wherein recording can be performed on at least one of the groove track and land track.

55. The high density disc according to claim 21, wherein the high density disc comprises at least one transparent substrate; and
at least one recording layer, wherein the thickness of the transparent substrate is 0.2 mm or less.

56. The high density disc according to claim 22, wherein the high density disc comprises at least one transparent substrate; and
at least one recording layer, wherein the thickness of the transparent substrate is 0.2 mm or less.

57. The high density disc according to claim 1, wherein an inner diameter of the data area is within a range of 35–40 mm.

58. The high density disc according to claim 57, wherein, when the inner diameter of the data area is 36 mm, the outer diameter thereof is within a range of 39–44 mm.

59. The high density disc according to claim 57, wherein, when the inner diameter of the data area is 40 mm, the outer diameter thereof is within a range of 42–48 mm.

60. The high density disc according to claim 57, wherein the high density disc comprises:
    at least one transparent substrate; and
    at least one recording layer,
    wherein the thickness of the transparent substrate is 0.2 mm or less.

61. The high density disc according to claim 57, wherein a boundary between the data area and the lead-out area is within a range of 62–64 mm.

62. The high density disc according to claim 57, wherein a boundary between the data area and the lead-out area is within a range of 76–79 mm.

63. The high density disc according to claim 57, wherein a boundary between the data area and the lead-out area is within a range of 116–119 mm.

64. The high density disc according to claim 21, wherein the high density disc comprises:
    a groove track; and
    a land track,
    wherein recording can be performed on at least one of the groove track and the land track.

65. The high density disc according to claim 64, wherein, when recording is performed at the groove track, the disc has a track high density pitch of 0.35 μm or less.

66. The high density disc according to claim 65, wherein a minimum mark length recorded at the groove track is 0.22 μm or less.

67. The high density disc according to claim 64, wherein, when recording is performed at the groove track and land track, the high density disc has a track pitch of 0.6 μm or less.

68. The high density disc according to claim 67, wherein a minimum mark length recorded at the groove track and land track is 0.22 μm or less.

69. The high density disc according to claim 22, wherein the high density disc comprises:
    a groove track; and
    a land track,
    wherein recording is performed on at least one of the groove track and the land track.

70. The high density disc according to claim 69, wherein, when recording is performed at the groove track, the high density disc has a track pitch of 0.35 μm or less.

71. The high density disc according to claim 70, wherein a minimum mark length recorded at the groove track is 0.22 μm or less.

72. The high density disc according to claim 69, wherein, when recording is performed at the groove track and land track, a track pitch is 0.6 μm or less.

73. The high density disc according to claim 72, wherein a minimum mark length recorded at the groove track and land track is 0.22 μm or less.

74. The high density disc according to claim 1, wherein a recording capacity of the high density disc is 25 GB on a single side.

75. The high density disc according to claim 20, wherein the overall diameter of the high density disc is 120 mm.

76. The high density disc according to claim 28, further comprising a polycarbonate disc used as a reinforcement plate having a thickness of 1.1 mm when the thickness of the transparent substrate is 0.1 mm, such that the high density disc has a thickness of 1.2 mm.

77. The high density disc according to claim 21, wherein the overall diameter of the disc is 80 mm.

78. The high density disc according to claim 21, wherein a recording capacity of the disc is 7.8 GB on a single side.

79. The high density disc according to claim 1,
    wherein a recording capacity of the disc is 0.65 GB on a single side.

80. The high density disc according to claim 1,
    wherein a recording capacity of the disc is 7.8 GB on a single side.

* * * * *

UNITED STATES PATENT AND TRADEMARK OFFICE
CERTIFICATE OF CORRECTION

| | |
|---|---|
| PATENT NO. | : 7,088,666 B2 |
| APPLICATION NO. | : 10/188311 |
| DATED | : August 8, 2006 |
| INVENTOR(S) | : Yong-hoon Lee et al. |

It is certified that error appears in the above-identified patent and that said Letters Patent is hereby corrected as shown below:

On title page item (57) Abstract change "A high density disc having a data area which is set such that compatibility is secured in the same drive while maintaining a superior recording/reproducing feature, is disclosed. The high density disc has a center hole, a clamping area, a data area where user data is recorded, a lead in area located at the inner side of the data area, and a lead out area located at the outer side of the data area. In the high density disc in which the diameter of the center hole is 10 mm or more, the inner diameter of the clamping area is characteristically within a range of 20-26 mm. Also, the inner diameter of the data area is characteristically within a range of 35-40 mm. Therefore, while a conventional disc drive is still used, the size of the high density disc decreases and a recording capacity can be increased." to -- A high density disc having a data area which is set such that compatibility is secured in the same drive while maintaining a superior recording and/or reproducing feature. The high density disc has a center hole, a clamping area, a data area where user data is recorded, a lead-in area located at the inner side of the data area, and a lead-out area located at the outer side of the data area. In the high density disc in which the diameter of the center hole is 10 mm or more, the inner diameter of the clamping area is characteristically within a range of 20-26 mm. Also, the inner diameter of the data area is characteristically within a range of 35-40 mm. Therefore, while a conventional disc drive is still used, the size of the high density disc decreases and a recording capacity can be increased. --

Column 11, line 62, delete "within"

Column 12, line 12, change "claim 2" to -- claim 1 --

Column 13, line 57, change "claim 4" to --claim 5 --

Signed and Sealed this

Twentieth Day of February, 2007

JON W. DUDAS
*Director of the United States Patent and Trademark Office*